US007899195B2

(12) United States Patent
Okumura et al.

(10) Patent No.: US 7,899,195 B2
(45) Date of Patent: Mar. 1, 2011

(54) ADAPTIVE HOWLING CANCELLER

(75) Inventors: Hiraku Okumura, Hamamatsu (JP); Hiroaki Fujita, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1603 days.

(21) Appl. No.: 11/175,936

(22) Filed: Jul. 6, 2005

(65) Prior Publication Data

US 2006/0008076 A1 Jan. 12, 2006

(30) Foreign Application Priority Data

Jul. 9, 2004 (JP) ............................ 2004-202893

(51) Int. Cl.
*H04R 27/00* (2006.01)
*H04M 9/08* (2006.01)
*H04B 3/20* (2006.01)

(52) U.S. Cl. ....................... 381/83; 379/406.05; 381/66

(58) Field of Classification Search ................... 381/66, 381/83, 93; 379/406.05–406.09, 406.12–406.14
See application file for complete search history.

(56) References Cited

U.S. PATENT DOCUMENTS 5,388,080 A 2/1995 Feintuch et al.
5,428,605 A 6/1995 Andre
5,610,909 A * 3/1997 Shaw .................... 379/406.08
5,682,378 A * 10/1997 Betts et al. ............. 379/406.06
6,381,224 B1 4/2002 Lane et al.
6,760,436 B1 * 7/2004 Takada .................. 379/406.06

FOREIGN PATENT DOCUMENTS

EP 0505949 A1 9/1992

(Continued)

OTHER PUBLICATIONS

Inazumi, Imai, and Konishi, Hauling Prevention in a Sound-Reinforcement System Using the LMS Algorithm, Acoustical Society of Japan, pp. pp. 417-418, (Mar. 1991).

(Continued)

*Primary Examiner*—Ping Lee
(74) *Attorney, Agent, or Firm*—Pillsbury Winthrop Shaw Pittman LLP

(57) ABSTRACT

An adaptive howling canceller has a plurality of adaptive filters. A delay adds a time delay of an acoustic feedback path to an electric signal fed from an amplifier of a sound-reinforcement system. Each adaptive filter filters the output signal of the delay with a filter coefficient, which is periodically updated at an update interval. The update interval of each adaptive filter is set to decrease successively from a first one to a last one of the adaptive filters. Adders are arranged in correspondence to the adaptive filters in series between a microphone and the amplifier. Each adder subtracts the output signal of the corresponding adaptive filter from an output signal fed from a preceding adder to thereby provide an output signal to a succeeding adder. The output signal from each adder is inputted into the corresponding adaptive filter. The audio signal from the microphone is inputted to the first adder, while the output signal from the last adder is inputted through the amplifier to the speaker and to the delay as the electric signal. The filter coefficient of each adaptive filter is updated so as to simulate a transfer function of the acoustic feedback path based on the output signals of the corresponding adder and the delay.

7 Claims, 7 Drawing Sheets

FOREIGN PATENT DOCUMENTS

| | | | |
|---|---|---|---|
| EP | 1191813 | A1 | 3/2002 |
| EP | 1429315 | A1 | 6/2004 |
| JP | 6013938 | | 1/1994 |

OTHER PUBLICATIONS

Korean Patent Office, Notification of Office Action for Application No. 10-2005-61814 (dated: Sep. 29, 2006; 4 pgs.).

Feb. 22, 2010 Office Action from European Patent Office; Application No. 05 106 131.5; 5 pages.

* cited by examiner

PRIOR ART

ADAPTIVE HOWLING CANCELLER

BACKGROUND OF THE INVENTION

1. Technical Field

The present invention is directed to an adaptive howling canceller for use in preventing howling from developing in a sound-reinforcement system installed in auditoria, halls and the like.

2. Related Art

Hitherto, there are known adaptive howling cancellers for preventing howling from developing by using an adaptive filter (adaptive digital filter). Such a technology is disclosed for*example in non-patent document of Inazumi, Imai, and Konishi: "howling prevention in a sound-reinforcement system using the LMS algorithm", Acoustical Society of Japan, proceedings pp. 417-418 (1991, 3).

FIG. 12 shows a schematic circuit diagram of a sound-reinforcement system with the type of howling canceller equipped. A microphone 1 and a speaker 4 are placed in a given room. The audio signal input through the microphone 1 is transformed to a signal y(k) in a digital domain through an A/D (analog to digital) conversion process. The y(k) represents a signal at the time kT (where T designates a sampling interval of the audio signal). The signal y(k) is supplied through an adder 2 to an amplifier 3 for amplification. G(z) represents the transfer function of the amplifier 3. The signal x(k) output from the amplifier 3 will be converted to the signal in analog domain by means of a D/A (digital to analog) conversion process, then this electric signal is transformed by the speaker 4 to the acoustic signal.

The acoustic feedback loop 5 is an acoustic path from the speaker 4 to the microphone 1, which has a transfer function H(z). The feedback acoustic signal d(k) fed back through the acoustic feedback loop 5 will be intermixed with the acoustic source signal s(k) composed of the audio signal from the audio source such as a narrator, prior to input into the microphone 1. The microphone 1 will transform the intermixed audio signal from the input to output the electric signal.

The sound-reinforcement system as have been described above may establish a closed loop composed of the path from the microphone 1 through amplifier 3 to speaker 4 then through acoustic feedback loop 5 to microphone 1, resulting in a developed howling due to the increase of the feedback acoustic signal d(k). The adaptive howling canceller has been devised in order to prevent the development of such howling, which includes a delay 6, an adaptive filter 7, and an adder 2.

The delay 6 may output the signal x(k) with a time delay $\tau$ in correspondence with the amount of time delay in the acoustic feedback loop 5, and the output signal x(k-$\tau$) will be supplied to the adaptive filter 7. The adaptive filter 7 includes a digital filter 7*a* and a filter coefficient estimation unit 7*b*, as shown in FIG. 13, the signal x(k-$\tau$) is input to both of the digital filter 7*a* and the filter coefficient estimation unit 7*b*. The digital filter 7*a* outputs a signal do(k) that simulates the feedback audio signal d(k), in accordance with the transfer function F(z), and the signal do(k) will be subtracted from the signal y(k) by the adder 2. The signal y(k) can be represented by an expression as y(k)=s(k)+d(k). The output signal e(k) of the adder 2 can be represented by an expression as e(k)=y(k)−do(k)=s(k)+Δ(k) {where Δ(k)=d(k)−do(k)}. Accordingly, the signal e(k) will be substantially equal to s(k) without the influence of the signal d(k), provided that Δ(k) is sufficiently small, to allow preventing the development of howling. Without the delay 6, the audio source signal s(k) input into the microphone 1 will be input to the adder 2 while also inputting into the adaptive filter 7 with no delay. Since the adaptive filter 7 updates the filter coefficient so as to decrease an error signal e(k), along with the progress of update of the filter coefficient, the audio source signal s(k) in the adder 2 will become canceled by the output signal from the adaptive filter 7. For this reason, the delay 6 is indispensable in order to cancel the feedback audio signal d(k) with the signal do(k) while at the same time preventing the audio source signal s(k) from being canceled.

The filter coefficient estimation unit 7*b* recurrently updates the filter coefficient of the digital filter 7*a* so that the transfer function F(z) matches with or approximate to the transfer function H(z) by using the adaptive algorithm and based on the signals x(k-$\tau$) and e(k). The exemplary adaptive algorithm used includes for example LMS (least mean square) algorithm. When the mean square value of the signal e(k) is represented by J=E [e (k)$^2$] (where E[*] indicates an expectation value), the filter coefficient that makes J minimum will be estimated by computation to update the filter coefficient of the digital filter 7*a* by using thus estimated filter coefficient. As a result of this, a signal that simulates the signal d(k) can be derived for the signal do(k), allowing the howling to be prevented from developing.

In accordance with the prior art described above, when using an adaptive filter 7 which is shorter (has smaller number of taps) as compared with the transfer function H(z), there may arise a problem that the sound quality is severely affected. The inventors of the present invention have conducted an experimental simulation of howling prevention by means of the sound-reinforcement system as shown in FIG. 12.

FIG. 11 shows the result of the experimental simulation. In FIG. 11, when $e_2$(k) in the ordinate is read as e(k), FIG. 11 indicates the change over time of the signal e(k). In the experimentation, the transfer function H(z) has 48,000 taps set, and the adaptive filter 7 has the number of taps of 256, respectively. In FIG. 11, there is no divergence of amplitude, indicating that the howling has been prevented from developing. However, since the adaptive filter 7 simulates only 256 taps of the head part with respect to the transfer function H(z) that has total 48,000 taps, the simulation of the transfer function H(z) is not sufficient so that the signal e(k) has a higher level and the sound quality is significantly affected.

In order to decrease the influence to the sound quality, it is sufficient to approximate the number of taps of the adaptive filter 7 to the entire length of transfer function H(z). However, since LMS algorithm updates the filter coefficient for each sample, the update interval is obviously short (the time to compute a new filter coefficient is short), while the amount of computation per unit time (will be abbreviated as "amount of computation" herein below) required for the update of filter coefficient increases in proportion to the number of taps. Accordingly, in a room where the transfer function H(z) is respectively long (namely, the reverberation time is relatively long) the number of taps is limited by the amount of computation, and the number of taps cannot be increased even if one attempts to increase the number of taps so as to bring it closer to the length of transfer function H(z). Therefore, the sound quality is severely affected and the sound quality is inevitably decreased.

On the other hand, for the adaptive algorithm, there are known algorithms which have a much longer update interval to update the filter coefficient for every tens of thousands samples, such as STFT-CS (Short Time Fourier Transform and Cross Spectrum), and it can be conceivable to update the filter coefficient of the adaptive filter 7 by using one of such algorithms. In such a case, the filter coefficient can be updated with less amount of computation even when the number of taps of the adaptive filter is increased, so that the transfer function can be simulated sufficiently for a room which has a long transfer function (i.e., long reverberation time) while at the same time the sound quality can be less affected. However, if the howling develops much quicker than the update period of filter coefficient, the update of filter coefficient is likely to delay when compared to the development of howling, some howling might be developed transitorily.

SUMMARY OF THE INVENTION

The object of the present invention is to provide a novel adaptive howling canceller which allows the howling to be positively prevented from developing in a room with long reverberation time.

A first adaptive howling canceller in accordance with the present invention is provided, which is for use in a sound-reinforcement system including a microphone installed in a given space for collecting therefrom an audio signal, a speaker installed in the space such that an acoustic feedback path is formed from the speaker to the microphone, and an amplifier connected between an output of the microphone and an input of the speaker for amplifying the audio signal fed from the microphone to provide an electric signal to the speaker. The inventive adaptive howling canceller is used for suppressing a feedback component of the audio signal fed back from the speaker to the microphone through the acoustic feedback path with a given time delay. The inventive adaptive howling canceller comprises: a delay section that adds a time delay corresponding to the time delay of the acoustic feedback path to the electric signal which is provided from the amplifier to thereby output the electric signal added with the time delay as an output signal; a first adaptive filter that has an input for receiving the output signal fed from the delay section and that filters the output signal of the delay section with a first filter coefficient, which is periodically updated at an update interval; a second adaptive filter that has an input for receiving the output signal fed from the delay section and that filters the output signal of the delay section with a second filter coefficient, which is periodically updated at another update interval set shorter than the update interval of the first filter coefficient; a first adder section that has an input for receiving an output signal fed from the first adaptive filter, and that subtracts the output signal of the first adaptive filter from the audio signal fed from the microphone to thereby provide an output signal as a result of subtracting; and a second adder section that has an input for receiving an output signal fed from the second adaptive filter, and that subtracts the output signal of the second adaptive filter from the output signal of the first adder section to thereby provide an output signal as a result of subtracting. In the inventive adaptive howling canceller, the output signal from the first adder section is inputted into the first adaptive filter, and the output signal from the second adder section is inputted into the second adaptive filter. Also, the output signal from the second adder section is inputted through the amplifier to the speaker and to the delay section as the electric signal. Further, the first filter coefficient is updated by the first adaptive filter so as to simulate a transfer function of the acoustic feedback path based on the output signals of the first adder section and the delay section, and the second filter coefficient is updated by the second adaptive filter so as to simulate the transfer function of the acoustic feedback path based on the output signals of the second adder section and the delay section.

In accordance with the first inventive adaptive howling canceller as set forth above, the first adaptive filter has its update interval of filter coefficient set longer, while the second adaptive filter has its update interval of filter coefficient set shorter. In the first adaptive filter, the number of taps can be in the order of thousands to tens of thousands, and the update interval of the filter coefficient can be every few thousands to tens of thousands of samples. The adaptive algorithm, which may be suitable to such criteria, includes for example STFT-CS method. The adaptive algorithm of STFT-CS method has less amount of computation required for updating the filter coefficient and higher estimation precision of transfer function if the filter has a large number of taps. In the first adaptive filter, if the transfer function of the acoustic feedback path is longer (reverberation time is longer), a long transfer function can be sufficiently simulated by increasing the number of taps in order to reduce the influence to the sound quality.

In the second adaptive filter, the number of taps can be in the order of tens to hundreds, and the update interval of the filter coefficient can be every each sample to few hundreds samples. The adaptive algorithm suitable to such criteria may include for example LMS algorithm and RLS (Recursive Least Square) algorithm. Since such type of algorithms may update very quickly the filter coefficient, the number of computation increases significantly along with the increase of number of taps of the filter. However, the first inventive adaptive howling canceller has a large number of taps in the first adaptive filter and a less number of taps in the second adaptive filter so that the amount of computation in the second adaptive filter can be suppressed. Accordingly the second adaptive filter has the characteristics in that the response speed to the howling is improved to positively suppress the howling that may develop abruptly in such a case as the transfer function in the acoustic feedback path vary spontaneously.

Accordingly, in accordance with the first inventive adaptive howling canceller, the influence to the sound quality can be minimized while the development of howling can be positively prevented, as well as the amount of computation can be suppressed even in a room with a longer transfer function (longer reverberation time).

A second adaptive howling canceller in accordance with the present invention is provided, which is for use in a sound-reinforcement system including a microphone installed in a given space for collecting therefrom an audio signal, a speaker installed in the space such that an acoustic feedback path is formed from the speaker to the microphone, and an amplifier connected between an output of the microphone and an input of the speaker for amplifying the audio signal fed from the microphone to provide an electric signal to the speaker. The inventive adaptive howling canceller is used for suppressing a feedback component of the audio signal fed back from the speaker to the microphone through the acoustic feedback path with a given time delay. The inventive adaptive howling canceller comprises: a delay section that adds a time delay corresponding to the time delay of the acoustic feedback path to the electric signal which is provided from the amplifier to thereby output the electric signal added with the time delay as an output signal; a plurality of adaptive filters that are arranged in three or more numbers in parallel with each other, each adaptive filter having an input for receiving the output signal fed from the delay section and filtering the output signal of the delay section with a filter coefficient, which is periodically updated at an update interval, the update interval of each adaptive filter being set to decrease successively from a first one of the adaptive filters to a last one of the adaptive filters; and a plurality of adder sections that are arranged in correspondence to the plurality of the adaptive filters and are connected in series from a first one of the adder sections to a last one of the adder sections between the microphone and the amplifier, each adder section having an input for receiving an output signal fed from the corresponding adaptive filter and subtracting the output signal of the corresponding adaptive filter from an output signal fed from a preceding one of the adder sections to thereby provide an output signal as a result of subtracting to a succeeding one of the adder sections. In the inventive adaptive howling canceller, the output signal from each adder section is inputted into the corresponding adaptive filter. The audio signal from the microphone is inputted to the first one of the adder sections, while the output signal from the last one of the adder sections is inputted through the amplifier to the speaker and to the delay section as the electric signal. Further, the filter coefficient of each adaptive filter is updated by each adaptive filter so as to simulate a transfer function of the acoustic feedback path based on the output signals of the corresponding adder section and the delay section.

The second inventive adaptive howling canceller as set forth above may comprise three adaptive filters at minimum. In such a case, the second inventive adaptive canceller may be equivalent to a variation of the first inventive adaptive howling canceller described above with an additional set of third adaptive filter and third adder section which is provided in a similar arrangement to the set of the second adaptive filter and the second adder section and which is connected in parallel to the set of the second adaptive filter and the second adder section, and with the update interval of filter coefficient in the third adaptive filter being set smaller than that of second adaptive filter. There can be four or more additional sets of adaptive filter and adder section in a similar manner.

In accordance with the second inventive adaptive howling canceller, a similar effect to the first inventive adaptive howling canceller can be obtained, and practically there is an advantage that facilitates to prevent the howling from developing in an audio facility used in a vast space such as a large hall and the like.

In the first and second inventive adaptive howling cancellers as have been described above, it can be conceivable to add a mixer section that mixes the output signal of the first adaptive filter to the output signal of the delay section to be inputted into the second adaptive filter. In this case, the second adaptive filter can estimate an appropriate filter coefficient based on the output signal of the mixer section and the output signal of the second adder section.

In a preferable form of the first and second inventive adaptive howling cancellers described above, the second adaptive filter resets the second filter coefficient to an initial value when the first adaptive filter updates the first filter coefficient. By such a manner, the reverberation due to past filter coefficients can be suppressed in the second adaptive filter, to thereby improve the estimation precision of the filter coefficient. In this case, the first adaptive filter may estimate a new value of the first filter coefficient for updating the first filter coefficient with reference to the second filter coefficient of the second adaptive filter before the second adaptive filter resets the second filter coefficient. By doing so, the first adaptive filter may estimate an appropriate filter coefficient by taking into account the filter coefficient of the second adaptive filter.

In accordance with the present invention, there are provided, in an adaptive howling canceller, a first adaptive filter having a longer update interval of filter coefficient and a second adaptive filter having a shorter update interval of filter coefficient to suppress in each of adaptive filters the feedback audio signal, so as to obtain an effect that the howling may be positively prevented from developing in a room of long reverberation time while alleviating the degradation of sound quality.

DETAILED DESCRIPTION OF THE INVENTION

Figure 1:
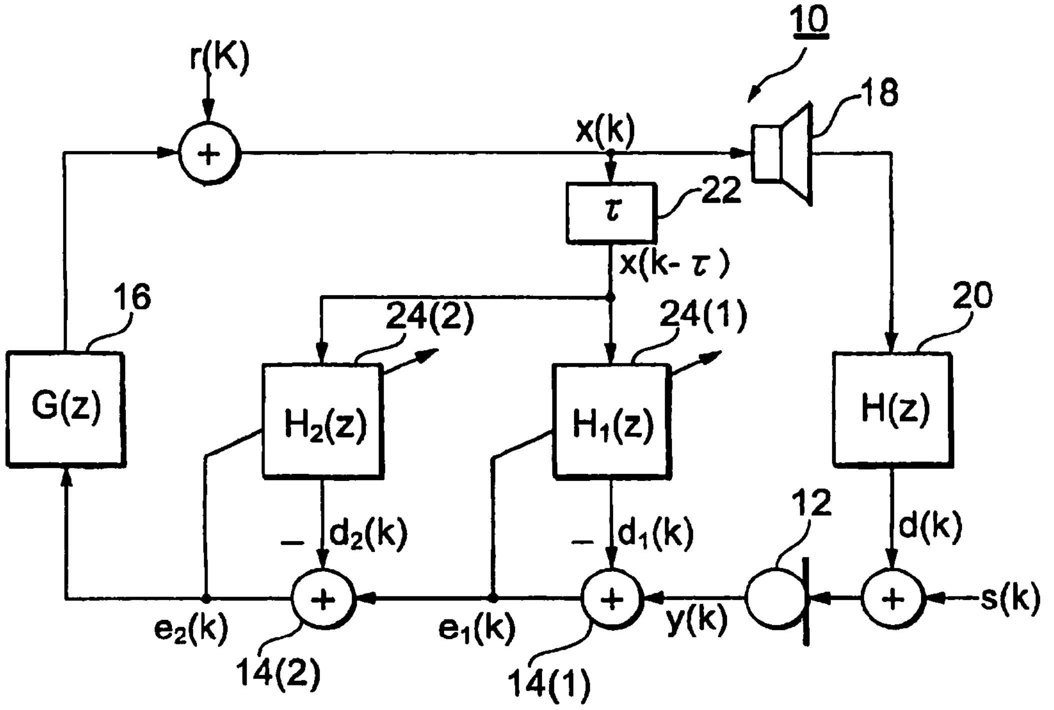
FIG. 1 is a schematic circuitry diagram of a sound-reinforcement system incorporating the adaptive howling canceller in accordance with first preferred embodiment of the present invention.

FIG. 1 shows a sound-reinforcement system incorporating the adaptive howling canceller in accordance with a first preferred embodiment of the present invention. In a given space such as an auditorium or a hall, a microphone 12 and a speaker 14 are placed. The audio signal input through the microphone 12 is transformed to signal y(k) in the digital form by an A/D conversion process. The signal y(k) is fed through adder units 14 (1), 14 (2) to an amplifier unit 16 for amplification. The amplifier unit 16 may or may not have a filter function (frequency component change function) in addition to amplification function. G(z) designates to a transfer function of the amplifier unit 16. Signal x(k) output from the amplifier unit 16 is D/A converted to a signal in the analog form, which signal is then transformed by the speaker 18 to the acoustic sound. Here r(k) indicates noise component, and the symbol of adder which receives r(k) indicates that some noise is penetrated.

An acoustic feedback path 20 is an acoustic path from the speaker 18 to the microphone 12, and this path has a transfer function H(z). Feedback audio signal d(k) fed back through the acoustic feedback path 20 will be input into the microphone 12 after mixture with the audio source signal s(k) composed of the audio signal from a source such as a narrator. The microphone 12 will transform the mixed audio signal to an electric signal to output.

Figure 13:
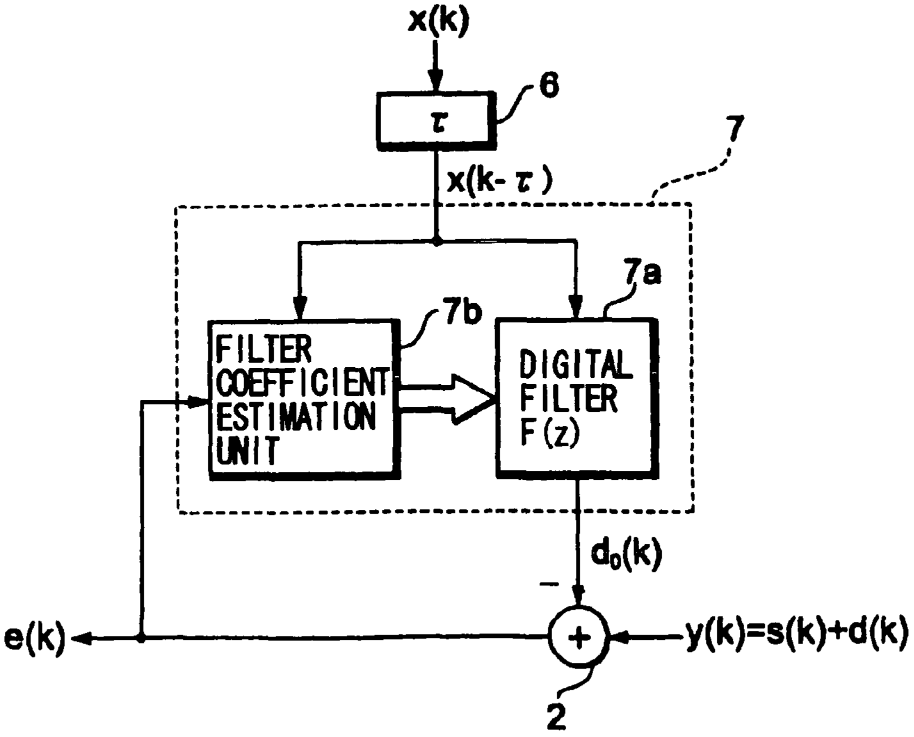
PRIOR ART FIG. 13
FIG. 13 is a schematic circuit diagram illustrative of details of the adaptive filter shown in FIG. 12.

The adaptive howling canceller includes a delay unit 22, adaptive filters 24 (1), 24 (2), and adder units 14 (1), 14 (2). The delay unit 22 outputs by adding time delay $\tau$ that corresponds to the time delay in the acoustic feedback path 20 to the signal x(k), and its output signal $x(k-\tau)$ is fed to the adaptive filter 24 (1), 24 (2), respectively. The adaptive filters 24 (1) and 24 (2) are in the arrangement similar to that described with respect to FIG. 13, which output signals $d_1(k)$, $d_2(k)$ simulating the feedback audio signal d(k) in compliance with their respective transfer functions $H_1(z)$ and $H_2(z)$.

The signal $d_1(k)$ is fed to the adder unit 14 (1) to be subtracted from the input signal y(k). The adder unit 14 (1) outputs signal $e_1(k)=y(k)-d_1(k)=s(k)+d(k)-d_1(k)$, and supplies the output signal $e_1(k)$ to the succeeding adder unit 14 (2) and to the corresponding adaptive filter 24 (1). The signal $d_2(k)$ is fed to the adder unit 14 (2) to be subtracted from the signal $e_1(k)$. The adder unit 14 (2) outputs a signal $e_2(k)=e_1(k)-d_2(k)=s(k)+d(k)-d_1(k)-d_2(k)$, and supplies this output signal $e_2(k)$ to the corresponding adaptive filter 24 (2) and to the amplifier unit 16. $\Delta k_{12}=d(k)-d_1(k)-d_2(k)$ is given, then the signal $e_2(k)$ can be expressed as equation $e_2(k)=s(k)+\Delta k_{12}$. When the canceller sufficiently minimizes $\Delta k_{12}$, the signal $e_2(k)$ will be substantially equal to s(k) with no influence of signal d(k), to thereby achieve the prevention of howling development.

In the adaptive filter 24 (1), the number of taps should be greater, for example in the order of thousands to tens of thousands; the update interval of the filter coefficient should be longer, for example once for every thousands to tens of thousands of samples. As an adaptive algorithm which meets to this criteria, for example STFT-CS method and the like can be used. By using such an adaptive algorithm and based on signals $x(k-\tau)$ and $e_1(k)$, in order to perform the filter coefficient updating at a longer update interval so as for the transfer function $H_1(z)$ to match with or approximate to the transfer function H(z), signal $d_1(k)$ which simulates the signal d(k) can be obtained.

In the adaptive filter 24 (2), the number of taps should be fewer, for example in the order of tens to hundreds; the update interval of the filter coefficient should be shorter, for example once for every each sample to few hundreds samples. As an adaptive algorithm which meets to this criteria, for example LMS algorithm or RLS algorithm may be used. By using such an adaptive algorithm and based on the signal $x(k-\tau)$ and $e_2(k)$, in order to perform the filter coefficient updating at a shorter update interval so as for the transfer function $H_2(z)$ to match with or approximate to the transfer function H(z), signal $d_2(k)$ which simulates the signal d(k) can be obtained.

Foregoing $\Delta k_{12}$ can be reduced by obtaining signals $d_1(k)$ and $d_2(k)$ as have been described above, to prevent howling from developing. In accordance with the present invention, the adaptive filters 24 (1) and 24 (2) having an update interval of filter coefficient different each from another is used to achieve an adaptive howling canceller that has a better convergence performance (convergence precision and convergence velocity) irrespective of source signal.

Table 1 below indicates the relative response speed to the howling and the amount of computation required for updating the filter coefficient, with respect to the adaptive algorithm which has a longer update interval for use in the adaptive filter 24 (1) such as STFT-CS and the other adaptive algorithm which has a shorter update interval for use in the adaptive filter 24 (2) such as LMS algorithm. ○ indicates an advantage, and X indicates a disadvantage.

TABLE 1

| Items | Update interval of adaptive algorithm | |
|---|---|---|
| | Shorter (LMS) | Longer (STFT-CS, etc.) |
| Response to the hauling | Faster (O) | Slower (X) |
| Amount of computation needed for updating filter coefficients | Larger (X) | Smaller (O) |

In accordance with Table 1, the adaptive algorithm with a longer update interval has a slower response speed to the howling, however it has an advantage that the amount of computation is smaller for updating the filter coefficient even when the number of taps increases. On the other hand, although the adaptive algorithm with a shorter update interval requires a larger amount of computation for updating the filter coefficient, it has an advantage of faster response speed to the howling.

Table 2 below indicates the orders of the amount of computation required for the update of filter coefficient as a function of the number of taps, N, of the adaptive filter, with respect to the STFT-CS method used as the adaptive algorithm in the adaptive filter 24 (1) as well as the LMS algorithm used as the adaptive algorithm in the adaptive filter 24 (2).

TABLE 2

| Filter | Adaptive Algorithm | Order of computation |
|---|---|---|
| 24 (1) | STFT-CS | $O(\log_2 N)$ |
| 24 (2) | LMS | O (N) |
| | RLS | $O(N^2)$ |

From Table 2 above, it can be seen that STFT-CS method shows a slight increase of the amount of computation along with the increase of the number of taps N, while on the other hand LMS algorithm shows an increase of the amount of computation in proportion to the increase of the number of taps N, and the RLS algorithm increases the amount of computation in proportion to a square of the number of taps N.

The present invention uses an adaptive algorithm with a longer update interval for the adaptive filter 24 (1) such as STFT-CS method so that the amount of computation is less even when the number of taps is larger. Because of this, the increased number of taps allows to estimate at a higher precision the transfer function $H_1(z)$ so as to simulate a longer period of the transfer function H(z). This allows also reducing the influence to the sound quality. In addition the amount of computation can be retained minimal.

Figure 12:
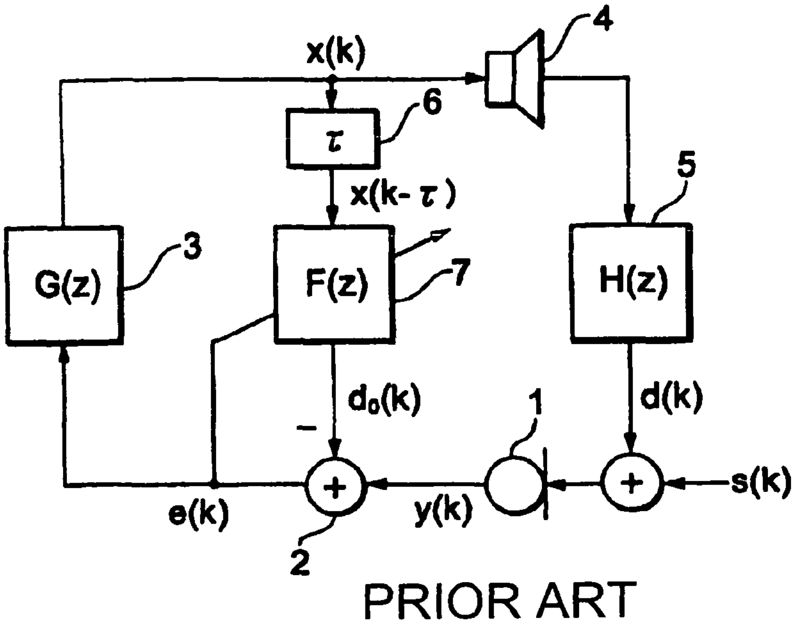
FIG. 12 is a schematic circuit diagram of a sound-reinforcement system incorporating a adaptive howling canceller of the prior art.

On the other hand, the adaptive filter 24 (2) uses such an adaptive algorithm as LMS algorithm and the like, which has a shorter interval of update, allowing to keep the response speed to the howling faster and to positively suppress the howling that develops quickly in such a case as the transfer function H(z) abruptly changes. In addition, even when the transfer function H(z) of the room is longer (the reverberation time is longer), the adaptive filter 24 (2) can set a smaller number of taps to save the amount of computation. The total amount of computation of the adaptive filters 24 (1) and 24 (2) will be less than the case in which the filter coefficient of an adaptive filter having the large number of taps is updated by using only LMS algorithm in the circuitry shown in FIG. 12.

It should be noted that the adaptive filter 24 (1) using an adaptive algorithm of longer update interval and the adaptive filter 24 (2) using an adaptive algorithm of shorter update interval are required to connect so as not to deteriorate the estimation precision of the filter coefficients as well as the preventive capability of howling development. The adaptive algorithm is based on an assumption that "it estimates the filter coefficient within a sufficiently shorter period of time than the temporal changes in the time-varying acoustic system to be applied." This implies that the adaptive filter 24 (2), which has a shorter update interval than that of the adaptive filter 24 (1), (i.e., the temporal change of filter coefficient is much faster) should be connected so as not to interfere the system to which the adaptive filter 24 (1) is applied. On the other hand the adaptive filter 24 (1), which has a filter coefficient changing much slower than the adaptive filter 24 (2), may be connected so as to affect the system to which the adaptive filter 24 (2) is applied. By this reason, in the circuitry shown in FIG. 1, the system to which the adaptive filter 24 (2) is applied incorporates the adaptive filter 24 (1) (or, the adaptive filter 24 (2) is avoided to interfere the system to which the adaptive filter 24 (1) is applied).

Although the temporal change of filter coefficient in the adaptive filter 24 (1) is sufficiently slower than the temporal change of filter coefficient in the adaptive filter 24 (2), it is not as small as it can be completely disregarded. It is therefore preferable to introduce a oblivion index into the filter coefficient updating in the adaptive filter 24 (2), or to reset the filter coefficient of the adaptive filter 24 (2) to the initial value (e.g., zero) at the time of filter coefficient updating in the adaptive filter 24 (1) to decrease the influence by the past filter coefficient. Furthermore, when resetting the filter coefficient of the adaptive filter 24 (2) at the time of filter coefficient updating in the adaptive filter 24 (1), the filter coefficient of the adaptive filter 24 (1) may be updated by referring to the filter index of the adaptive filter 24 (2) that is subject to reset, prior to resetting.

Figure 2:
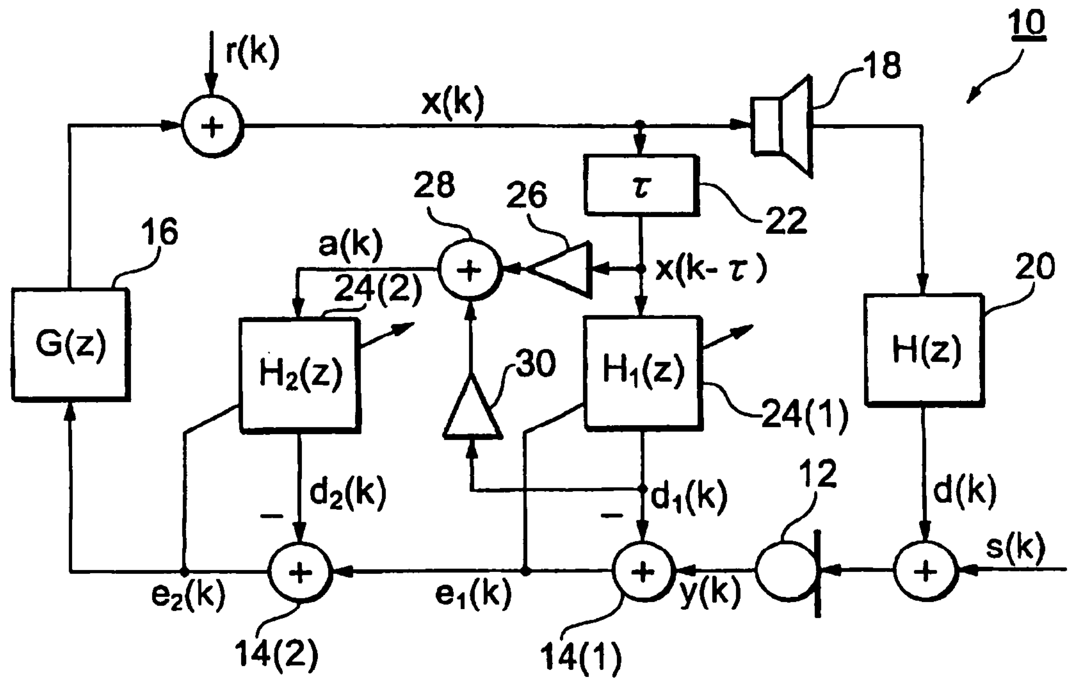
FIG. 2 is a schematic circuitry diagram of a sound-reinforcement system incorporating the adaptive howling canceller in accordance with second preferred embodiment of the present invention.

FIG. 2 shows a sound-reinforcement system incorporating the adaptive howling canceller in accordance with the second preferred embodiment of the present invention. The similar parts are designated to the identical reference numbers to those in FIG. 1 and the detailed description of the parts already described in the preceding embodiment will be omitted.

The feature of the embodiment shown in FIG. 2 is that the output signal of the delay unit 22 is fed through a buffer 26, that the output signal $d_1(k)$ of the adaptive filter 24 (1) is fed through a buffer 30 to an adder unit 28, and that a mixed signal $a(k)=x(k-\tau)+d_1(k)$ is fed as the adder output from the adder unit 28 to the adaptive filter 24 (2). In the adaptive filter 24 (2) the mix signal a(k) is used instead of the signal $x(k-\tau)$ shown in FIG. 1 to estimate the filter coefficient based on the mix signal a(k) and the signal $e_2(k)$. The similar effect to the adaptive howling canceller shown in FIG. 1 can be obtained in this configuration.

Figure 3:
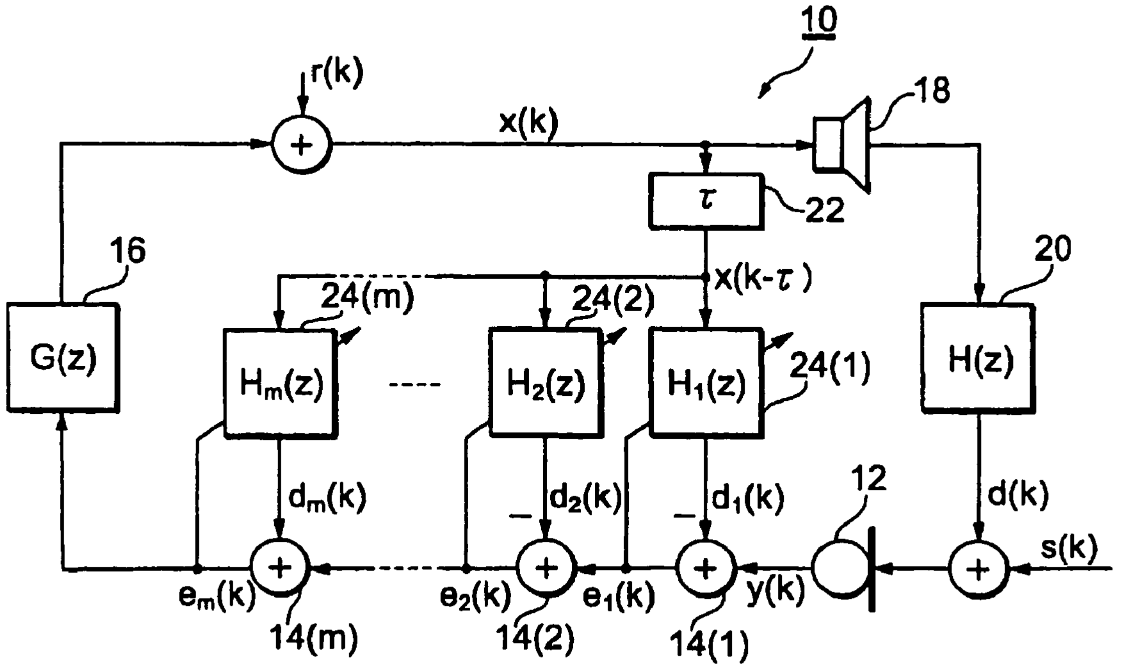
FIG. 3 is a schematic circuitry diagram of a sound-reinforcement system incorporating the adaptive howling canceller in accordance with third preferred embodiment of the present invention.

FIG. 3 shows a sound-reinforcement system incorporating the adaptive howling canceller in accordance with the third preferred embodiment of the present invention, and the similar parts are designated to the identical reference numbers to FIG. 1 and the detailed description of the parts already described in the preceding embodiments will be omitted.

The feature of the preferred embodiment shown in FIG. 3 is that there are provided first to m-th (where m is an integer equal to or more than 3) adaptive filters 24 (1)-24 (*m*) to which the output signal $x(k-\tau)$ of the delay unit 22 is supplied respectively, and that first to m-th adder units are connected in series at the output side of the microphone 12. The first to m-th adaptive filters will output signals $d_1(k)$ to dm(k) that simulate the signal d(k) respectively in compliance with their respective transfer function $H_1(z)$ to Hm(z) in order to supply the signals $d_1(k)$ to dm(k) to the respective adder units 14 (1) to 14 (*m*). The adder unit 14 (1) thus outputs the signal $e_1(k)$ that is made by subtracting the signal $d_1(k)$ from the signal y(k), the adder unit 14 (2) outputs the signal $e_2(k)$ that is made by subtracting the signal $d_2(k)$ from the $e_1(k)$, the adder unit 14 (3) outputs the signal e3(*k*) that is made by subtracting the signal d3(*k*) from the signal $e_2(k)$, and so on, such that the adder units 14 (1) to 14 (*m*) are connected in series, so that the output signals $e_1$ (k) to em(k) of adder units 14 (1) to 14 (*m*) are respectively fed to the corresponding adaptive filters 24 (1) to 24 (*m*).

The number of taps and the update interval of the filter coefficient are set such that the number of taps and the update interval of the filter coefficient are gradually decreased from the first adaptive filter 24 (1) to the last adaptive filter 24 (*m*). As an example, when m=3, then the number of taps of the adaptive filters 24 (1), 24 (2) and 24 (3) will be set in the order of tens of thousands, few thousands, and tens to hundreds, and the update interval of the filter coefficient of the adaptive filters 24 (1), 24 (2) and 24 (3) will be set to be updated once for every tens of thousands samples, every thousands samples, and one to hundreds samples, respectively.

The circuitry shown in FIG. 3 is an extended form of FIG. 1 with equal to or more than three sets of adaptive filter and adder unit, and the effect similar to that described above with reference to FIG. 1 can be obtained. In addition, incorporating equal to or more than three sets of adaptive filter and adder unit allows to facilitate preventing the howling from developing in the sound-reinforcement system in a large space such as a large auditorium.

In the circuitry of FIG. 3, it is also conceivable that the signal $d_1(k)$ mixed with the signal $x(k-\tau)$ is supplied to the adaptive filter 24 (2), instead of the signal $x(k-\tau)$, as have been described above in relation to FIG. 2. Furthermore, in the similar manner, the signal dm-1(*k*) mixed with the signal $x(k-\tau)$ may also be supplied to the adaptive filter 24 (*m*).

As described above, according to the third embodiment of the invention, a plurality of adaptive filters 24 are arranged in three or more numbers in parallel with each other. Each adaptive filter 24 has an input for receiving the output signal fed from the delay section 22 and filtering the output signal of the delay section 22 with a filter coefficient, which is periodically updated at an update interval. The update interval of each adaptive filter 24 is set to decrease successively from the first adaptive filter 24(1) to the last adaptive filter 24(*m*). A plurality of adder sections 14 are arranged in correspondence to the plurality of the adaptive filters 24 and are connected in series from a first adder section 14(1) to a last adder section 14(*m*) between the microphone 12 and the amplifier 16. Each adder section 12 has an input for receiving an output signal fed from the corresponding adaptive filter 24 and subtracting the output signal of the corresponding adaptive filter 24 from an output signal fed from a preceding one of the adder sections to thereby provide an output signal as a result of subtracting to a succeeding one of the adder sections. The output signal from each adder section 14 is inputted into the corresponding adaptive filter 24. The audio signal from the microphone 12 is inputted to the first adder section 14(1), while the output signal from the last adder section 14(*m*) is inputted through the amplifier 16 to the speaker 18 and to the delay section 22 as the electric signal. The filter coefficient of each adaptive filter 24 is updated by each adaptive filter 24 so as to simulate a transmission function of the acoustic feedback path 20 based on the output signals of the corresponding adder section 14 and the delay section 22.

Incidentally, the adaptive howling canceller 10 may further comprises a mixer section that mixes the output signal of one adaptive filter to the output signal of the delay section to be inputted into another adaptive filter succeeding to said one adaptive filter. Practically, one adaptive filter resets the filter coefficient thereof to an initial value when another adaptive filter preceding to said one adaptive filter updates the filter coefficient thereof. In such a case, said another adaptive filter estimates a new value of the filter coefficient of said another adaptive filter for updating the filter coefficient of said another adaptive filter with reference to the filter coefficient of said one adaptive filter before said one adaptive filter resets the filter coefficient of said one adaptive filter.

Figure 4:
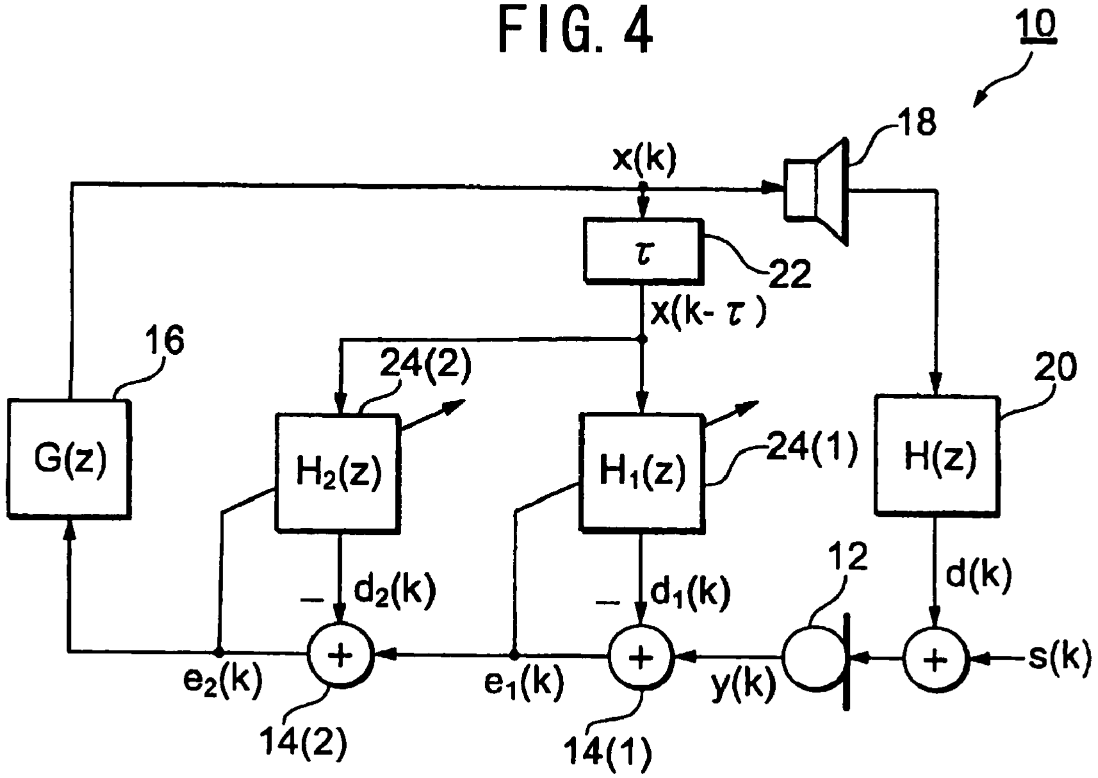
FIG. 4 is a schematic circuitry diagram of a sound-reinforcement system used in the experiment for verifying the inventive effect.

The inventors of the present invention have conducted a experimental simulation in order to confirm the effect of the invention. A sound-reinforcement system of the circuitry configuration as shown in FIG. 4 was used in this experiment. The circuitry shown in FIG. 4 is an identical configuration to that shown in FIG. 1, except that no adder unit is provided for mixing the noise component r(k), and the similar parts are designated to the identical reference numbers and the detailed description of the parts already described will be omitted. In the circuitry of FIG. 4, exemplary conditions of simulation used is set as follows:

adaptive filter 24 (1)
  number of taps: 16,384
  adaptive algorithm: STFT-CS method
adaptive filter 24 (2)
  number of taps: 256
  adaptive algorithm: leaky LMS algorithm
transfer function H(z)
  number of taps: 48,000

Figure 5:
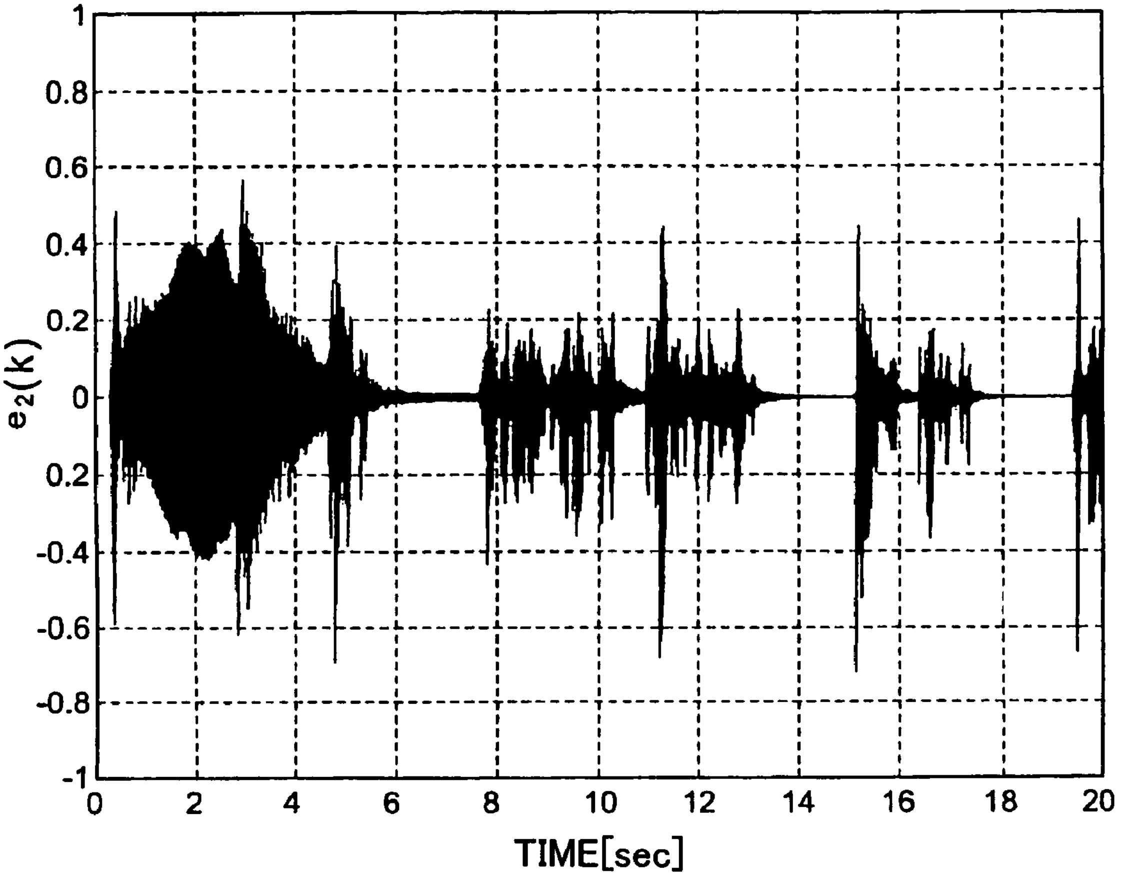
FIG. 5 is a waveform diagram illustrative of the change of signal e2(*k*) over time in the sound-reinforcement system shown in FIG. 4.

In FIG. 5, the change of the signal e2(*k*) over time is shown as the result of the experimental simulation conducted by using the circuitry of FIG. 4 under the simulative conditions as above.

Figure 6:
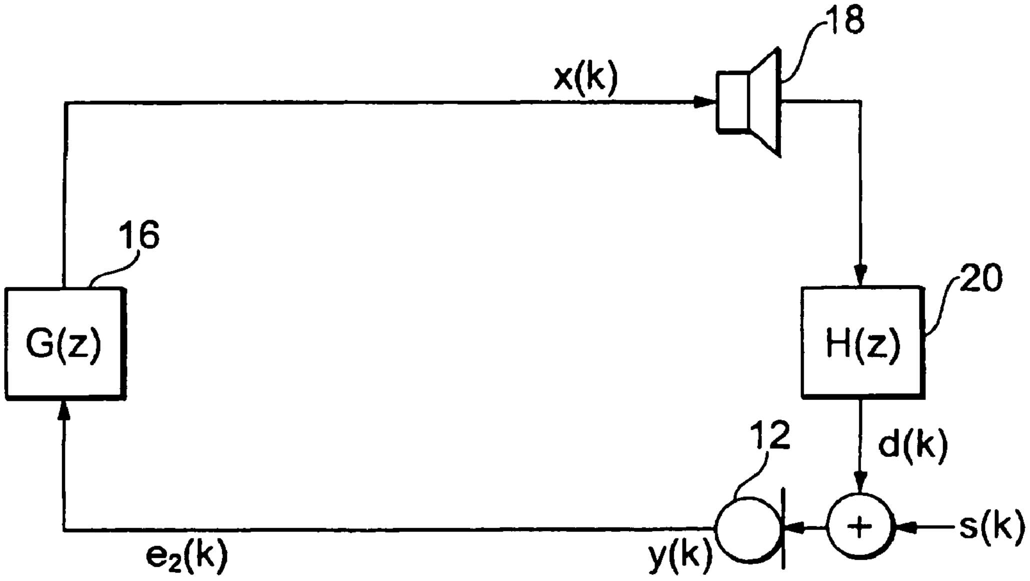
FIG. 6 is a schematic circuit diagram of a sound-reinforcement system in accordance with first comparative embodiment.
Figure 7:
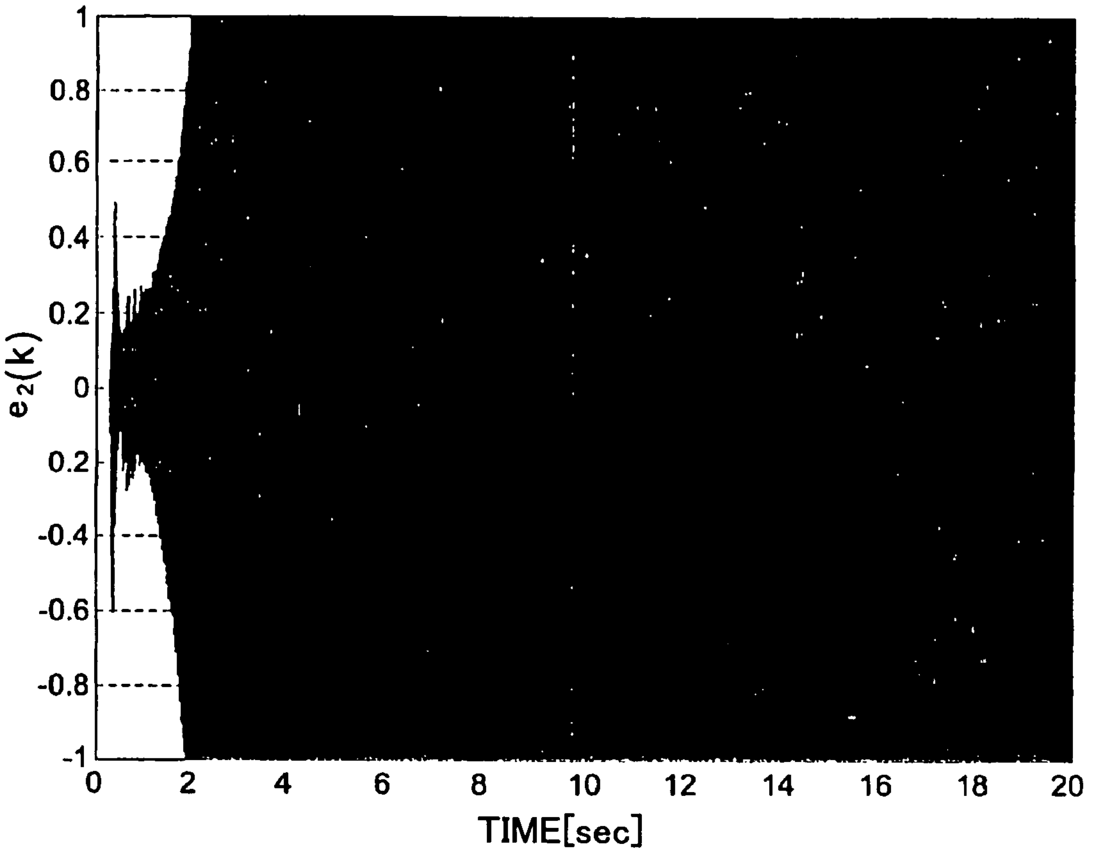
FIG. 7 is a waveform diagram illustrative of the change of signal e2(*k*) over time in the sound-reinforcement system shown in FIG. 6.

FIG. 6 shows a circuitry configuration of a sound-reinforcement system in accordance with first comparative embodiment. The circuitry shown in FIG. 6 is identical to the circuitry of FIG. 4 except that the adaptive howling canceller is eliminated, and the signal $e_2(k)$ is composed of signal y(k). In FIG. 7, the change of the signal e2(*k*) over time is shown as the result from the experimental simulation conducted by using the circuitry of FIG. 6 under the simulative conditions described above. It can be seen from FIG. 7 that the signal $e_2(k)$ became divergent immediately prior to the elapsed time of 2 [sec.] to develop a howling.

Figure 8:
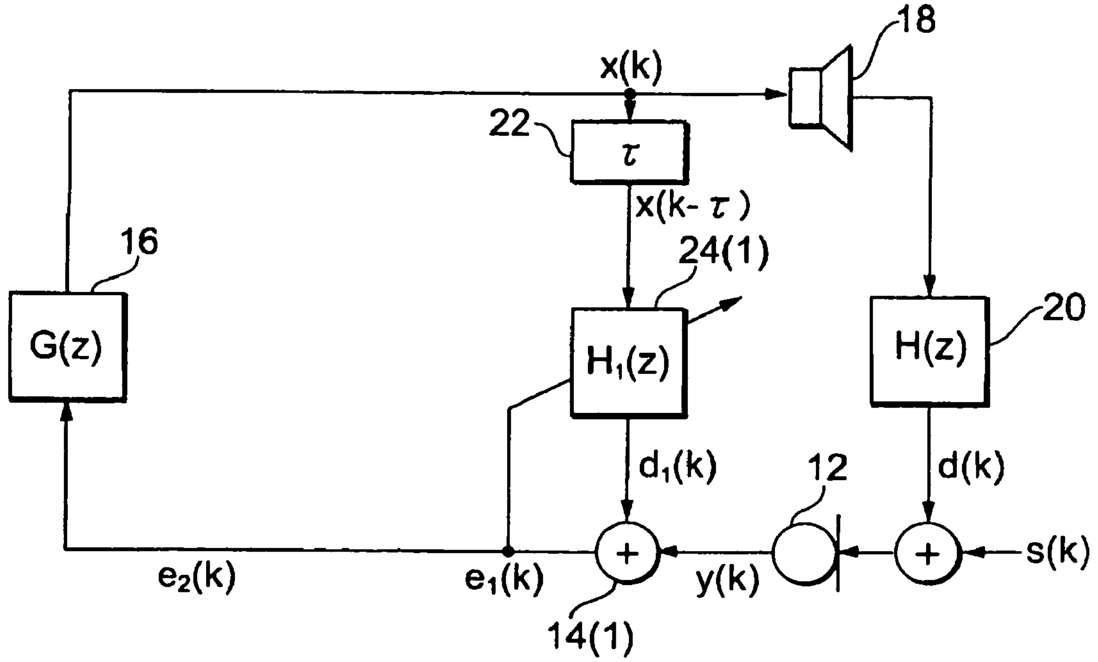
FIG. 8 is a schematic circuit diagram of a sound-reinforcement system in accordance with second comparative embodiment.
Figure 9:
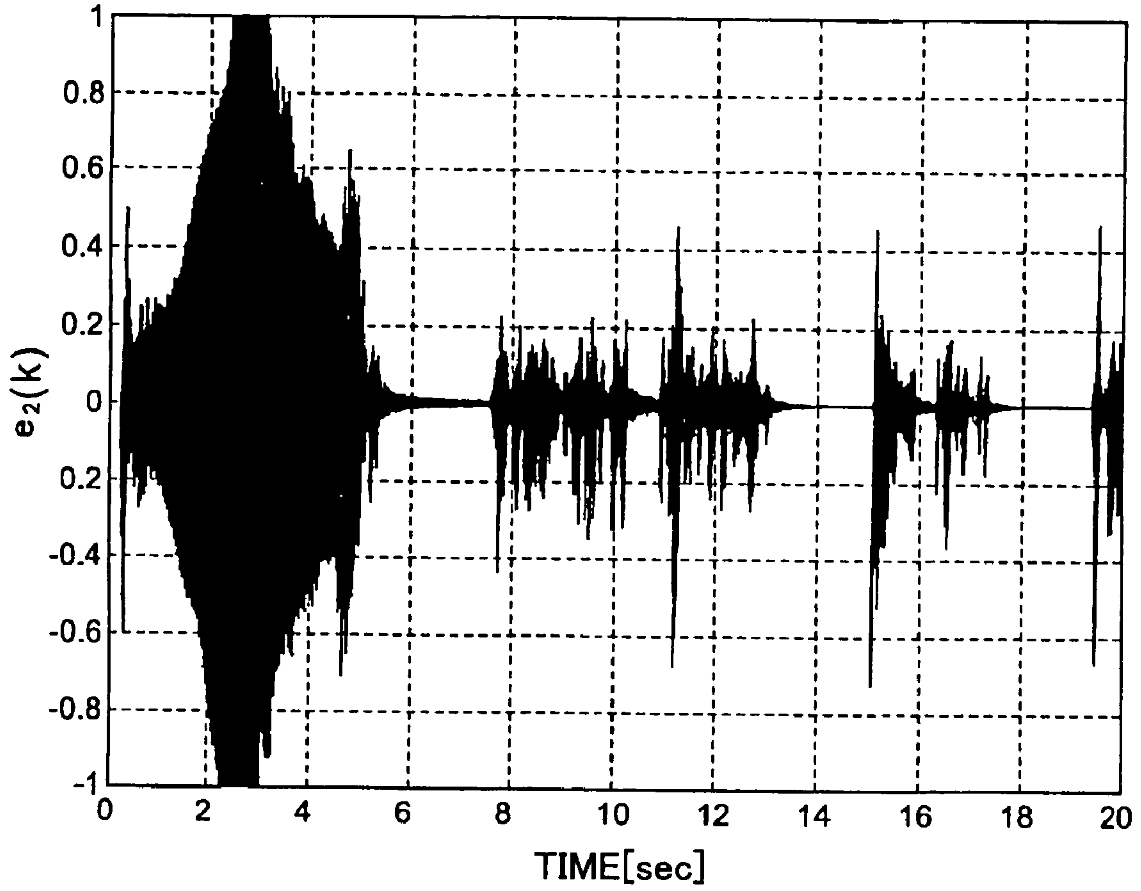
FIG. 9 is a waveform diagram illustrative of the change of signal e2(*k*) over time in the sound-reinforcement system shown in FIG. 8.

FIG. 8 shows a circuitry arrangement of a sound-reinforcement system in accordance with second comparative embodiment. The circuitry shown in FIG. 8 is identical to the circuitry of FIG. 4, except that the adaptive filter 24 (2) and the adder unit 14 (2) are eliminated, and the signal $e_2(k)$ is composed of signal $e_1(k)$. In FIG. 9, the change of the signal e2(*k*) over time is shown as the result of the experimental simulation conducted by using the circuitry of FIG. 8 under the simulative conditions described above. It can be seen from FIG. 8 that the signal $e_2(k)$ tends to be divergent before and after the elapsed time of 2 [sec.], however, the divergence is decreased to a lower level, indicating that the development of howling is suppressed, and the signal level is transitorily in excess, suggesting that the potential saturation may occur.

Figure 10:
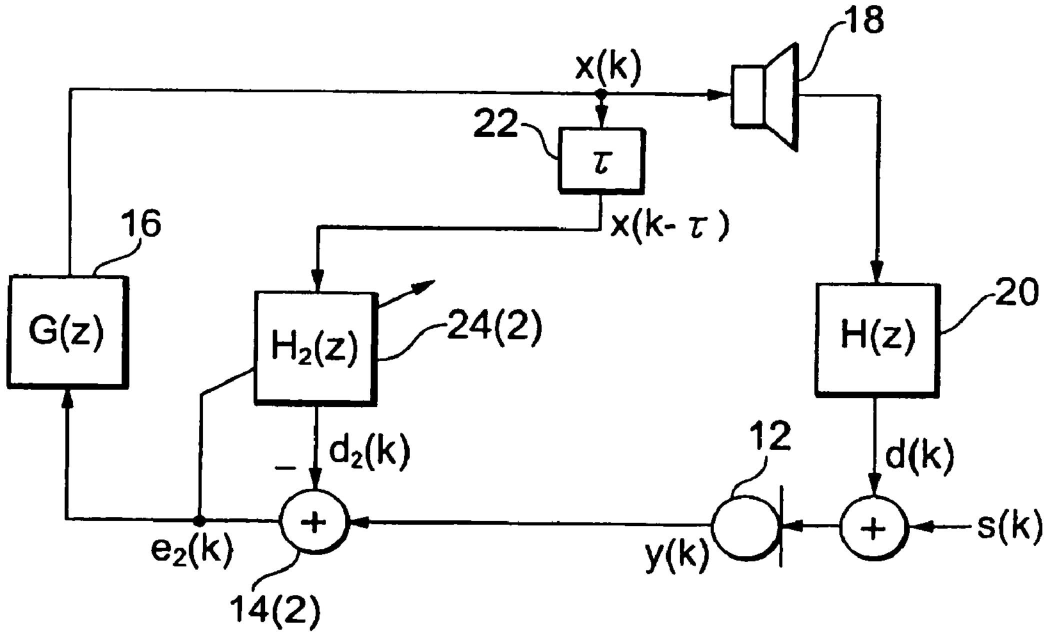
FIG. 10 is a schematic circuit diagram of a sound-reinforcement system in accordance with third comparative embodiment.
Figure 11:
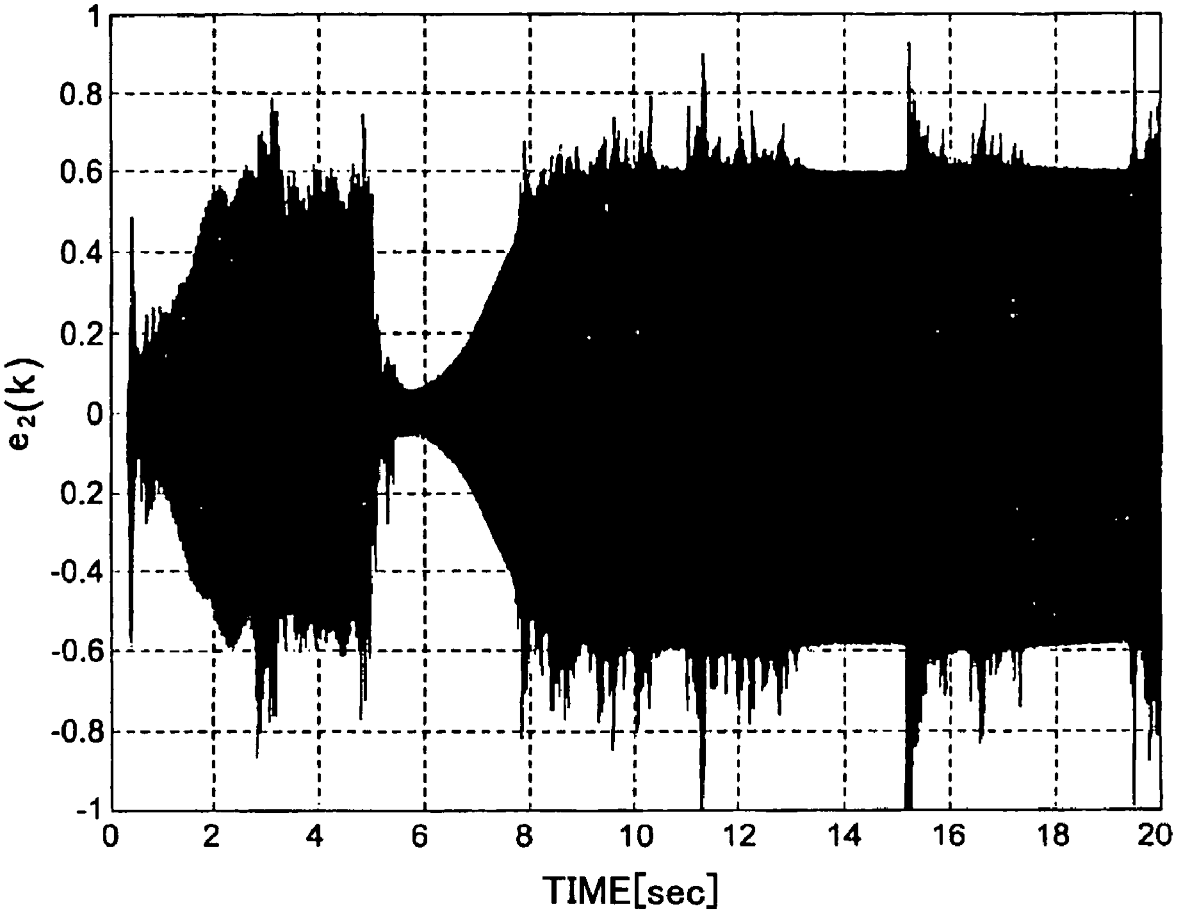
FIG. 11 is a waveform diagram illustrative of the change of signal e2(*k*) over time in the sound-reinforcement system shown in FIG. 10.

FIG. 10 shows a circuitry arrangement of a sound-reinforcement system in accordance with third comparative embodiment. The circuitry shown in FIG. 10 is identical to the circuitry of FIG. 4, except that the adaptive filter 24 (1) and the adder unit 14 (1) are eliminated, and the adder unit 14 (2) is input with the signal y(k). In FIG. 11, the change of the signal e2(*k*) over time is shown as the result of the experimental simulation conducted by using the circuitry of FIG. 10 under the simulative conditions described above. It can be seen from FIG. 11 that although the development of howling is suppressed, the level of signal $e_2(k)$ is somewhat elevated, indicating that the sound quality is significantly affected.

When comparing FIG. 5 with FIGS. 9 and 11, it can be seen in FIG. 5 in accordance with the present invention the level of the signal $e_2(k)$ is relatively lowered around the elapsed time of 2 [sec.], and decreased further thereafter. Therefore, in accordance with the present invention, the howling can be positively prevented from developing while allowing much less influence to the sound quality.

What is claimed is:

1. An adaptive howling canceller for use in a sound-reinforcement system including a microphone installed in a given space for collecting therefrom an audio signal, a speaker installed in the space such that an acoustic feedback path is formed from the speaker to the microphone, and an amplifier connected between an output of the microphone and an input of the speaker for amplifying the audio signal fed from the microphone to provide an electric signal to the speaker, the adaptive howling canceller being used for suppressing a feedback component of the audio signal fed back from the speaker to the microphone through the acoustic feedback path with a given time delay, the adaptive howling canceller comprising:

a delay section that adds a time delay corresponding to the time delay of the acoustic feedback path to the electric signal which is provided from the amplifier to thereby output the electric signal added with the time delay as an output signal;

a first adaptive filter that has an input for receiving the output signal fed from the delay section and that filters the output signal of the delay section with a first filter coefficient, which is periodically updated at an update interval;

a second adaptive filter that has an input for receiving the output signal fed from the delay section and that filters the output signal of the delay section with a second filter coefficient, which is periodically updated at another update interval set shorter than the update interval of the first filter coefficient;

a first adder section that has an input for receiving an output signal fed from the first adaptive filter, and that subtracts the output signal of the first adaptive filter from the audio signal fed from the microphone to thereby provide an output signal as a result of subtracting; and a second adder section that has an input for receiving an output signal fed from the second adaptive filter, and that subtracts the output signal of the second adaptive filter from the output signal of the first adder section to thereby provide an output signal as a result of subtracting, wherein the output signal from the first adder section is inputted into the first adaptive filter, and the output signal from the second adder section is inputted into the second adaptive filter, wherein the output signal from the second adder section is inputted through the amplifier to the speaker and to the delay section as the electric signal, wherein the first filter coefficient is updated by the first adaptive filter so as to simulate a transfer function of the acoustic feedback path based on the output signals of the first adder section and the delay section, and the second filter coefficient is updated by the second adaptive filter so as to simulate the transfer function of the acoustic feedback path based on the output signals of the second adder section and the delay section, and wherein the second adaptive filter resets the second filter coefficient to an initial value when the first adaptive filter updates the first filter coefficient.

2. The adaptive howling canceller in accordance with claim 1, further comprising a mixer section that mixes the output signal of the first adaptive filter to the output signal of the delay section to be inputted into the second adaptive filter.

3. The adaptive howling canceller in accordance with claim 1, wherein the first adaptive filter estimates a new value of the first filter coefficient for updating the first filter coefficient with reference to the second filter coefficient of the second adaptive filter before the second adaptive filter resets the second filter coefficient.

4. The adaptive howling canceller in accordance with claim 1, wherein the first adaptive filter has a first number of taps for filtering the output signal of the delay section, and the second adaptive filter has a second number of taps for filtering the output signal of the delay section, the first number being set greater than the second number, wherein the first adaptive filter uses a Short Time Fourier Transform and Cross Spectrum algorithm (STFT-CS algorithm) for updating the first filter coefficient, and wherein the second adaptive filter uses a least mean square algorithm (LMS algorithm) or a Recursive Least Square algorithm (RLS algorithm) for updating the second filter coefficient.

5. An adaptive howling canceller for use in a sound-reinforcement system including a microphone installed in a given space for collecting therefrom an audio signal, a speaker installed in the space such that an acoustic feedback path is formed from the speaker to the microphone, and an amplifier connected between an output of the microphone and an input of the speaker for amplifying the audio signal fed from the microphone to provide an electric signal to the speaker, the adaptive howling canceller being used for suppressing a feedback component of the audio signal fed back from the speaker to the microphone through the acoustic feedback path with a given time delay, the adaptive howling canceller comprising:

a delay section that adds a time delay corresponding to the time delay of the acoustic feedback path to the electric signal which is provided from the amplifier to thereby output the electric signal added with the time delay as an output signal;

a plurality of at least three adaptive filters that are arranged in parallel with each other, each adaptive filter having an input for receiving the output signal fed from the delay section and filtering the output signal of the delay section with a filter coefficient, which is periodically updated at an update interval, the update interval of each adaptive filter being set to decrease successively from a first one of the adaptive filters to a last one of the adaptive filters; and a plurality of adder sections that are arranged in correspondence to the plurality of the adaptive filters and are connected in series from a first one of the adder sections to a last one of the adder sections between the microphone and the amplifier, each adder section having an input for receiving an output signal fed from the corresponding adaptive filter and subtracting the output signal of the corresponding adaptive filter from an output signal fed from a preceding one of the adder sections to thereby provide an output signal as a result of subtracting to a succeeding one of the adder sections, wherein the output signal from each adder section is inputted into the corresponding adaptive filter, wherein the audio signal from the microphone is inputted to the first one of the adder sections, while the output signal from the last one of the adder sections is inputted through the amplifier to the speaker and to the delay section as the electric signal, wherein the filter coefficient of each adaptive filter is updated by each adaptive filter so as to simulate a transfer function of the acoustic feedback path based on the output signals of the corresponding adder section and the delay section, and wherein one adaptive filter resets the filter coefficient thereof to an initial value when another adaptive filter preceding to said one adaptive filter updates the filter coefficient thereof.

6. The adaptive howling canceller in accordance with claim 5, further comprising a mixer section that mixes the output signal of one adaptive filter to the output signal of the delay section to be inputted into another adaptive filter succeeding to said one adaptive filter.

7. The adaptive howling canceller in accordance with claim 5, wherein said another adaptive filter estimates a new value of the filter coefficient of said another adaptive filter for updating the filter coefficient of said another adaptive filter with reference to the filter coefficient of said one adaptive filter before said one adaptive filter resets the filter coefficient of said one adaptive filter.

* * * * *